Dec. 18, 1962 N. NICOLAUS 3,068,893
RUBBER BONDED VALVE
Filed May 21, 1959
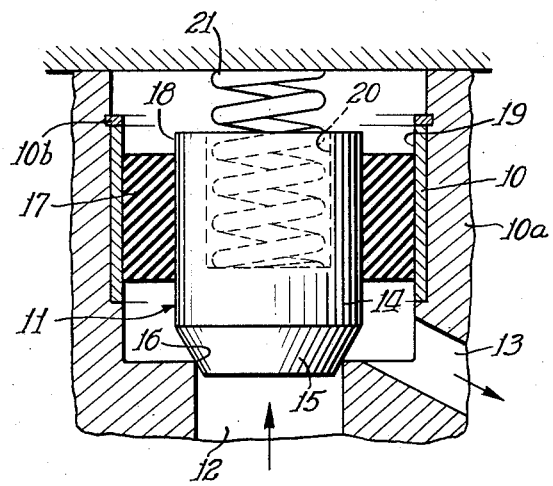
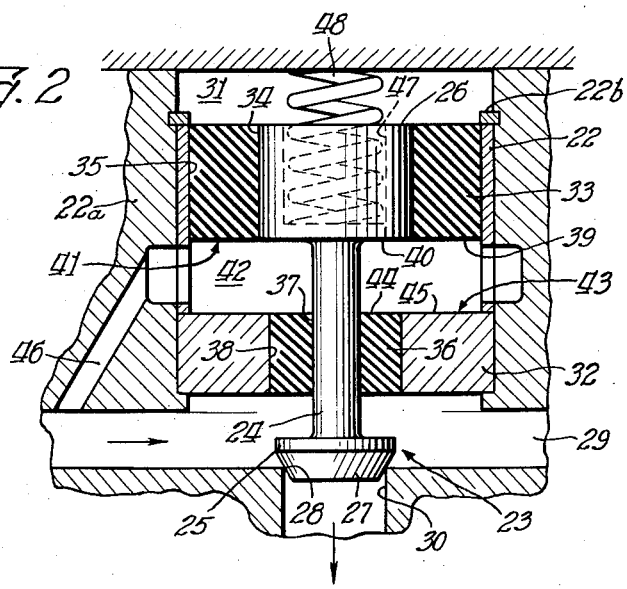
Inventor:
Norbert Nicolaus
By: F. A. Kruemark
Atty.

United States Patent Office 3,068,893
Patented Dec. 18, 1962

3,068,893
RUBBER BONDED VALVE
Norbert Nicolaus, Norostemmen-Hannover, Germany, assignor to Borg-Warner Corporation, Chicago, Ill., a corporation of Illinois
Filed May 21, 1959, Ser. No. 814,889
4 Claims. (Cl. 137—510)

This invention relates to valves and, more particularly, to valves of the type provided with a valve stem or shaft having a valve face for engagement with a valve seat and a guide for the shaft within which the shaft is moved for operation of the valve.

Valves of this type require costly machining and honing operations on both the valve shaft and in the valve guide so as to provide close fit and smooth surfaces for the operation of the shaft within the guide. This invention eliminates the necessity for these costly machining operations by providing a flexible rubber guide which is bonded to the shaft and to the inner periphery of a sleeve in the valve housing. The flexibility of the rubber will permit movement of the valve shaft in the operation of the valve and also seals against the loss of fluid. It is therefore an object of this invention to provide a rubber guide member for the valve shaft which is bonded thereto and to the inner perimeter of a sleeve in the valve housing whereby manufacturing cost is reduced and fluid loss past the guide member is eliminated.

This invention consists of the novel constructions, arrangements and devices to be hereinafter described and claimed for carrying out the above stated objects and such other objects as will be apparent from the following description of a preferred form of this invention, illustrated with reference to the accompanying drawings, wherein;

FIGURE 1 is an axial section view showing the components of a check valve including the rubber guide member; and FIGURE 2 is an axial section view showing the components of a relief valve including rubber guide members.

Like characters of reference designate like parts in the several views.

This invention is characterized primarily by the provision of a flexible rubber guide bonded to the valve shaft or stem and to the inner perimeter of a sleeve in the valve housing. The flexibility of the rubber guide permits the valve shaft or stem to move axially in the operation of the valve, and since it is bonded to the shaft and the inner periphery of a sleeve in the valve housing, escape of fluid is prevented.

More specifically, FIGURE 1 discloses a check valve provided with a close fitting sleeve 10 retained within a housing 10a by a retaining ring 10b, a valve shaft 11, an inlet 12 and an outlet 13. The valve shaft 11 is provided with a valve head 14 at one end thereof having a valve face 15 which is engageable with a valve seat 16. An annular rubber guide 17 is provided which is bonded to the outer perimeter 18 of the valve shaft 11 and to the inner perimeter 19 of the sleeve 10. A cylindrical recess 20 is provided in the other end of the valve shaft 11 for receiving a spring 21, under compression, for urging the valve face 15 into engagement with the valve seat 16.

In the manufacture of the valve, the rubber guide 17 is assembled between the sleeve 10 and the valve shaft 11 and bonded thereto. The resulting unit is then slid into the housing 10a and locked by the retaining ring 10b.

In operation, fluid under pressure from the inlet side 12 acting against the valve head 14 will overcome the resistance of the spring 21 as pressure is built up, thereby causing the unseating of the valve face 15 from the valve seat 16 which permits fluid flow through the outlet 13. With the cessation of pressure at the inlet side 12 of the valve, the valve face 15 re-engages the valve seat 16 under the influence of the bias of spring 21 thereby preventing backflow of the fluid from outlet 13. It is apparent that due to the flexibility of the rubber guide 17 that the valve is free to move up and down and that latitude for this movement is provided by free areas above and below the rubber guide 17 as will be apparent from the drawing.

The second embodiment of this invention is shown in FIGURE 2 wherein duplicate flexible rubber guides are provided in a relief type valve. More specifically, a sleeve 22 retained in a housing 22a by a retaining ring 22b is provided with a valve shaft 23 disposed therein which comprises a relatively small valve stem 24 having a valve head 25 at one end and an enlarged portion 26 at the other end. The valve head 25 is provided with a valve face 27 engageable with a valve seat 28 fixed with respect to a conduit 29 and a bypass 30. A cylindrical chamber 31 is provided within the upper end of the housing 22a and an inwardly extending sleeve 32 having a smaller inner diameter than the sleeve 22 is carried within the lower end of the housing 22a. A first flexible annular rubber guide 33 is positioned between the outer perimeter 34 of the enlarged portion 26 and the inner perimeter 35 of the sleeve 22, and bonded to both perimeters. A second flexible annular guide member 36 is provided between the outer perimeter 37 of the valve stem 24 and the inner perimeter 38 of the sleeve 32 and bonded to both perimeters. The first annular rubber guide 33 has a face 39 at its lower end which together with a face 40 at the lower end of the enlarged portion 26 provides a top wall 41 of an annular chamber 42 having a lower wall 43 comprising an upper face 44 of the second annular guide member 36 and an upper face 45 of the inwardly extending sleeve 32. A passageway 46 provides communication between the conduit 29 and the annular chamber 42. The enlarged stem portion 26 of the valve shaft 23 is provided with a cylindrical cavity 47 for receiving a spring 48 under compression for urging the valve face 27 into engagement with the valve seat 28.

In operation, fluid under pressure is introduced into the conduit 29 which provides the same p.s.i. in the annular chamber 42 by virtue of the passageway 46. It is common knowledge that the purpose of a relief valve is to prevent the build up of excessive pressure within a conduit and the components connected with it. In the instant case, the p.s.i. is exerted against the upper wall 41 of the chamber 42 which includes the lower wall 40 of the enlarged portion 26 of the valve shaft 23 whereby the valve face 27 will be unseated from the valve seat 28 when the pressure is sufficiently great to counteract the bias of spring 48 and the resistance of the first and second annular rubber guides 33 and 36 thus permitting fluid to leave the system by way of bypass 30. It is apparent that since the first and second annular guide members 33 and 36 are flexible, they will yield and permit the unseating of the valve, and since these annular rubber guide members are bonded to their respective contact surfaces, the fluid loss in these areas is prevented. Free areas into which the rubber guide members 33 and 36 may be deflected in the operation of the valve are provided by chambers 31 and 42 and the free areas below the guide member 36 as will be apparent from the drawing.

It should also be noted that the same manufacturing technique mentioned heretofore with respect to the first embodiment of this invention is also applicable to the second embodiment. The rubber guide members 33 and 36 are assembled between the sleeve 22 and the enlarged portion 26, and the sleeve 32 and valve stem 24 respectively and bonded thereto. The resulting structure is then slid into the housing 22a and locked by the retaining ring 22b.

I wish it to be understood that my invention is not to be limited to the specific constructions and arrangements shown and described as it will be understood to those skilled in the art that changes may be made without departing from the principles of the invention.

I claim:

1. In a relief valve connected with respect to a conduit provided with a source of fluid pressure; the combination of a valve housing; a sleeve in said housing; a valve body comprising a stem having a valve head at one end and an enlarged portion at the other end said valve head being provided with a valve face and said valve body being spaced from the inner periphery of said sleeve; a bypass having a valve seat and connected to said conduit; means urging said valve face into engagement with said valve seat; a first annular rubber member bonded to said enlarged portion and to the adjacent inner periphery of said sleeve; an annular inwardly extending portion in said housing, below and spaced from said first annular rubber member and said enlarged portion; a second annular rubber member between said valve stem and said inwardly extending portion and bonded to said valve stem and said inwardly extending portion, thereby providing an annular chamber between said annular rubber members; and a fluid passageway connected between said annular chamber and said conduit.

2. In a relief valve connected with respect to a conduit provided with a source of fluid pressure; the combination of a valve housing; a sleeve in said housing; a valve body comprising a stem having a valve head at one end and an enlarged portion at the other end said valve head being provided with a valve face and said valve body being spaced from the inner periphery of said sleeve; a first annular rubber member bonded to said enlarged portion and to the adjacent inner periphery of said sleeve; an annular inwardly extending portion in said housing, below and spaced from said first annular rubber member and said enlarged portion; a second annular rubber member between said valve stem and said inwardly extending portion and bonded to said valve stem and said inwardly extending portion, thereby providing an annular chamber between said annular rubber members; a fluid passageway connected between said annular chamber and said conduit; a relief passageway provided with a valve seat and connected to said conduit; and a spring biased with respect to said valve body for urging said valve face into engagement with said valve seat.

3. In a relief valve connected with respect to a conduit provided with a source of fluid pressure; the combination of a valve housing; first and second sleeves fitted in said housing said second sleeve having a smaller inner diameter than said first sleeve; a valve body comprising a stem having a valve head at one end and an enlarged portion at the other end, said valve head being provided with a valve face and said valve body being spaced from the inner periphery of said sleeves; a first annular rubber member bonded to said enlarged portion and to the inner periphery of said first sleeve; a second annular rubber member between said valve stem and said second sleeve and bonded to said valve stem and said second sleeve, the said second annular rubber member being spaced from said enlarged portion, thereby providing an annular chamber therebetween; a fluid passageway connected between said annular chamber and said conduit; a relief passageway connected to said conduit; a valve seat associated with said relief passageway for engaging said valve face; and means for urging said valve face into engagement with said valve seat.

4. In a relief valve connected with respect to a conduit provided with a source of fluid pressure; the combination of a valve housing; first and second sleeves fitted in said housing said second sleeve having a smaller inner diameter than said first sleeve; a valve body comprising a stem having a valve head at one end and an enlarged portion at the other end, said valve head being provided with a valve face and said valve body being spaced from the inner periphery of said sleeves; a first annular flexible member bonded to said enlarged portion and to the inner periphery of said first sleeve; a second annular flexible member between said valve stem and said second sleeve and bonded to said valve stem and said second sleeve, the said second annular flexible member being spaced from said enlarged portion, thereby providing an annular chamber therebetween; a fluid passageway connected between said annular chamber and said conduit; a relief passageway connected to said conduit; a valve seat associated with said passageway for engagement with said valve face; and means for urging said valve face into engagement with said valve seat.

References Cited in the file of this patent

UNITED STATES PATENTS

| | | |
|---|---|---|
| 868,219 | Pietzuch et al. | Oct. 15, 1907 |
| 2,183,889 | Magnuson | Dec. 19, 1939 |
| 2,623,535 | Morgan | Dec. 30, 1952 |
| 2,664,673 | Devorss | Jan. 5, 1954 |
| 2,731,033 | Cable | Jan. 17, 1956 |
| 2,908,288 | Carr | Oct. 13, 1959 |